June 4, 1935.  L. P. KALB  2,004,002
ENGINE
Filed April 13, 1932
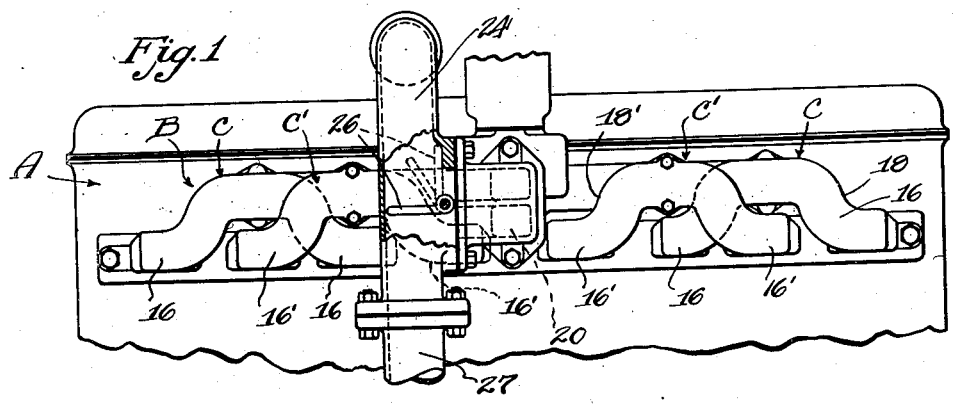
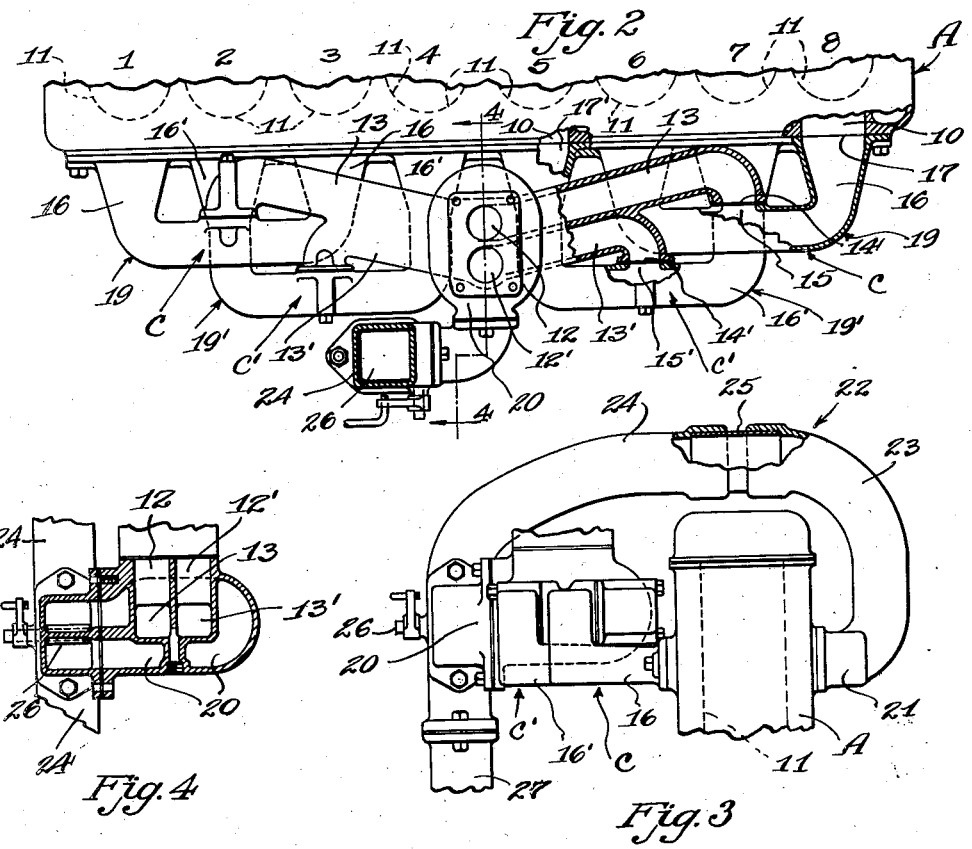
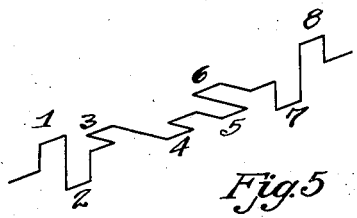
INVENTOR.
Lewis P. Kalb
BY
ATTORNEY.

Patented June 4, 1935

2,004,002

UNITED STATES PATENT OFFICE 2,004,002

ENGINE

Lewis P. Kalb, Grosse Pointe Village, Mich., assignor to Continental Motors Corporation, Detroit, Mich., a corporation of Virginia Application April 13, 1932, Serial No. 605,017

7 Claims. (Cl. 123—52)

My invention relates to engines and more particularly to an intake manifold structure for distributing and conducting fuel mixture to a plurality of cylinders of an internal combustion engine.

With the advent of multi-cylinder engines of the type employing six, eight, or twelve cylinders, and especially those employing eight cylinders, much difficulty has been experienced in uniformly distributing the fuel mixture to the cylinders. It has been found preferable to provide individual port runners for each cylinder, these port runners being connected to lateral runners or manifold branches in pairs. With engines of this type it has been proposed to connect a pair of cylinders to a branch and so construct the crankshaft and arrange the engine timing that the intake opening of said pair of cylinders connected to the same branch are spaced apart at least 270° of crankshaft rotation. With this last mentioned type of engine, distribution of the fuel is of vital importance and my present invention is especially adapted for use therewith.

An object of my present invention is to provide a manifold of the aforesaid type wherein efficient and uniform distribution of the fuel to the engine cylinders may be had.

Another object of my invention is to provide a compact intake manifold structure of the type employing a multiplicity of branches by providing an arrangement whereby the branches or port runners are constructed to cross over the lateral runners.

Further objects of my invention will be more apparent as the description progresses taken in connection with the accompanying drawing illustrating a preferred embodiment of my invention wherein like reference characters refer to like parts throughout the several views, and in which:

Fig. 1 is a fragmentary side elevational view of an internal combustion engine and showing an intake manifold associated therewith and constructed in accordance with my invention, Fig. 2 is a plan view of said manifold but showing a part thereof in section, Fig. 3 is a fragmentary end view of an engine and associated manifold structures and illustrating in more detail the cross over for conducting the exhaust gases of the engine in heat exchange relation with the intake manifold, Fig. 4 is a detail sectional view taken on the line 4—4 of Fig. 2, and Fig. 5 is a diagrammatic view of the engine crankshaft.

The intake manifold shown in the illustrated embodiment of my invention was particularly developed for use with an engine of the sleeve valve type and for purposes of illustration I have chosen to illustrate my manifold structure with an engine of that type, but it will be apparent that the principles of my invention may be adapted for engines other than those of the sleeve valve type and for engines having a more or less number of cylinders than the type illustrated.

The engine A is provided with intake passages 10 of the usual construction, the passages preferably each communicating with an engine cylinder 11. I have preferably shown eight cylinders in line respectively numbered 1 to 8 inclusive. The manifold structure B associated with engine A is preferably provided with outlets, one for each cylinder, but obviously my invention is not necessarily restricted to a specific structure such as the type illustrated.

The manifold structure B herein illustrated is preferably designed for use with a downdraft carburetor of the duplex type, the manifold having a pair of primary fuel conducting portions 12 and 12'. A pair of oppositely extending inner lateral runners 13 are arranged for connection with the conducting portion or riser 12 and another pair of oppositely extending outer lateral runners 13' are arranged for connection with the conducting portion or riser 12'. In the illustrated embodiment the lateral runners extend substantially longitudinally of the engine but are preferably extended obliquely with respect to the engine or in other words inclined as shown in Fig. 2, said lateral runners 13 and 13' being respectively provided with outlets 14 and 14' opening outwardly or away from the engine structure and the inner lateral runners 13 are preferably constructed greater in length than the outer lateral runners 13'.

Preferably the lateral runners 13 communicate with cylinders numbered 1, 3, 6 and 8 and the lateral runners 13' communicate with cylinders 2, 4, 5 and 7. The timing of the engine and the construction of the engine crankshaft is such that the intake opening of any two cylinders open to the same branch are spaced apart at least 270° of crankshaft rotation. The timing of the engine as illustrated by my present invention is preferably 1—6—2—5—8—3—7—4. Thus the intake opening of cylinders 1 and 3 are spaced apart at least 270° of crankshaft rotation, the same spacing being carried out with respect to the pairs of cylinders 5, 7 and 6, 8 as well as 2, 4.

Port runner structures are secured to each of said lateral runners, thus the port runner structures C are connected to the outlets 14 of lateral runners 13 and the port runner structures C' are connected to outlets 14' of the lateral runners 13'. The port runner structures C are each provided with an inlet 15 and substantially oppositely and inwardly extending branches 16 having outlets 17 communicating with the engine intake passages 10. The port runner structures C' are each provided with an inlet 15' and substantially oppositely and inwardly extending branches 16' having outlets 17' communicating with the engine intake passages 10.

It will be noted that all branches 16 and 16' are dipped downwardly as at 18 and 18' (see Fig. 1) and the branches 16' cross under the lateral runners 13. The branches 16 less remote from the riser 12 also cross under the lateral runner 13. The branches 16' most remote from the riser 12' cross over solely under the lateral runners 13 while the branches 16' less remote from the riser 12' cross under both lateral branches 13 and 13'. That portion of branches 16 and 16' respectively adjacent the outlets 17 and 17' preferably lie in substantially a common horizontal plane. The branches 16 and 16' of port runner structures C and C' are respectively provided with bends 19 and 19' intermediate the inlets and outlets 15, 17 and 15', 17', and that portion of said branches beyond the bends 19, 19' are preferably flared outwardly in the horizontal plane (see Fig. 2) and progressively reduced in height (see Figs. 1 and 3), whereby to straighten out the fuel flow beyond the bend and to induce the fuel to flow into the associated passages 10 in a direction substantially at right angles to the longitudinal plane of the engine. This straightening of the fuel flow beyond the bend is of particular importance with sleeve valve engines in which swirl control is of relatively great importance, and such control may be more readily had by controlling the direction of the fuel flow when being introduced into the intake passages 10.

The construction above described provides a very compact manifold structure and further provides a structure having fuel conducting portions of approximately the same length and with substantially the same number of turns or bends.

That portion of the manifold structure adjacent the primary fuel conducting portions or risers 12 and 12' is preferably provided with a heating jacket 20 in which the exhaust gases from the engine may be circulated for heating the intake gases. The exhaust gases are preferably carried over the top of the engine from the exhaust manifold 21 to the heating jacket 20 by means of an arched conducting means 22, said means consisting preferably of a portion 23 formed as part of the exhaust manifold and a portion 24 formed as a part of the intake manifold structure, these portions 23 and 24 being connected by a sleeve 25 preferably constructed of a minimum wall thickness for the purpose of restricting the flow of heat by conduction from the exhaust manifold to the intake manifold. In the illustrated embodiment of my invention the exhaust manifold is positioned on the opposite side of the engine from the intake manifold structure, which is typical for sleeve valve engines. If desired, this sleeve 25 may be constructed of a material which is not a good heat conductor irrespective of size to further insulate the intake manifold from the exhaust manifold. A valve 26 may be associated with the heating jacket 20 and may be manually or automatically actuated in any suitable manner to control the quantity of exhaust gases deflected into the heating jacket, said portion 24 being preferably offset to one side of the manifold riser portion as shown in Fig. 1 and extending substantially downwardly for connection with the usual exhaust pipe 27.

It will be apparent to those skilled in the art to which my invention pertains that various modifications and changes may be made therein without departing from the spirit of my invention or from the scope of the appended claims.

What I claim as my invention is:

1. An intake manifold structure for an engine and including a lateral runner terminating in an outlet port opening laterally outwardly of said engine, and a port runner connecting said lateral runner outlet port with the engine.

2. An intake manifold structure for an engine and including a lateral runner terminating in an outlet port opening laterally outwardly of said engine, and a manifold section connecting said lateral runner outlet port with the engine and consisting of a pair of port runner portions.

3. An intake manifold structure for an engine and including a lateral runner terminating in an outlet port opening laterally outwardly of said engine, and a port runner connecting said lateral runner outlet port with the engine and constructed to cross under the said lateral runner.

4. An intake manifold structure for an engine and including a lateral runner terminating in an outlet port opening laterally outwardly of said engine, and a manifold section connecting said lateral runner outlet with the engine and consisting of a pair of port runner portions, said port runner portions substantially extended in a common plane below the lateral runner.

5. An intake manifold structure for an engine and including a lateral runner terminating in an outlet port opening laterally outwardly of said engine, and a manifold section connecting said lateral runner outlet with the engine and consisting of a pair of port runner portions, said port runner portions being substantially extended in opposite directions in a common plane below the lateral runner, one of said port runner portions constructed to cross under the said lateral runner substantially at right angles therewith.

6. An intake manifold structure for an engine and including a pair of lateral runners extending substantially longitudinally of the engine, one of said runners being longer than the other, and port runner portions connecting said lateral runners with the engine, the port runner portions associated with the shorter of said lateral runners constructed and arranged to cross under the longer of said lateral runners.

7. An intake manifold structure for a multi-cylinder engine including a pair of lateral runners extending substantially in the same direction longitudinally of the engine, said lateral runners each terminating in a plurality of port runners of substantially equal length, said port runners extending for the most part in a common plane parallel with and beneath the plane containing the lateral runners, the port runners connected with one of said lateral runners being constructed to cross said other lateral runner.

LEWIS P. KALB.